United States Patent Office 3,516,209
Patented June 23, 1970

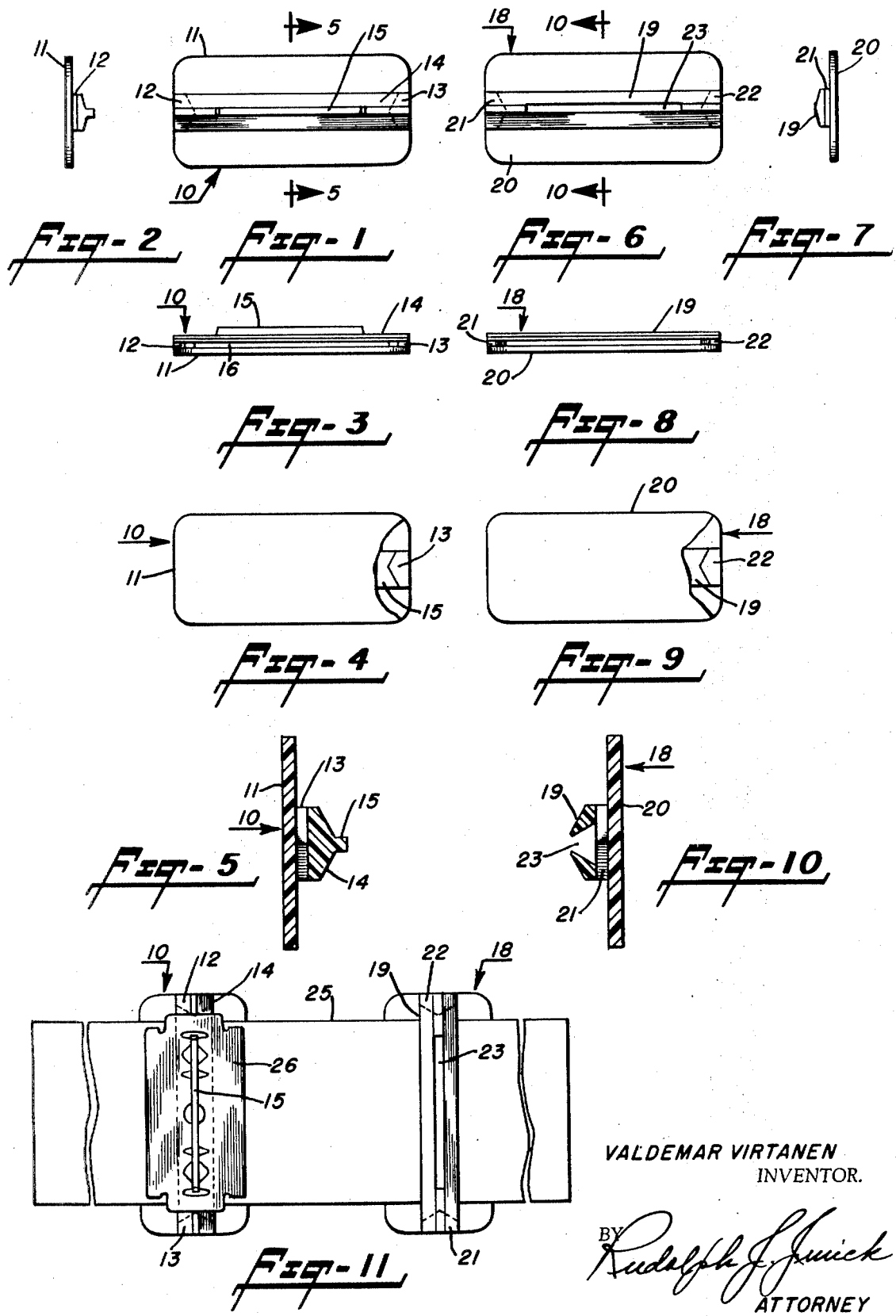

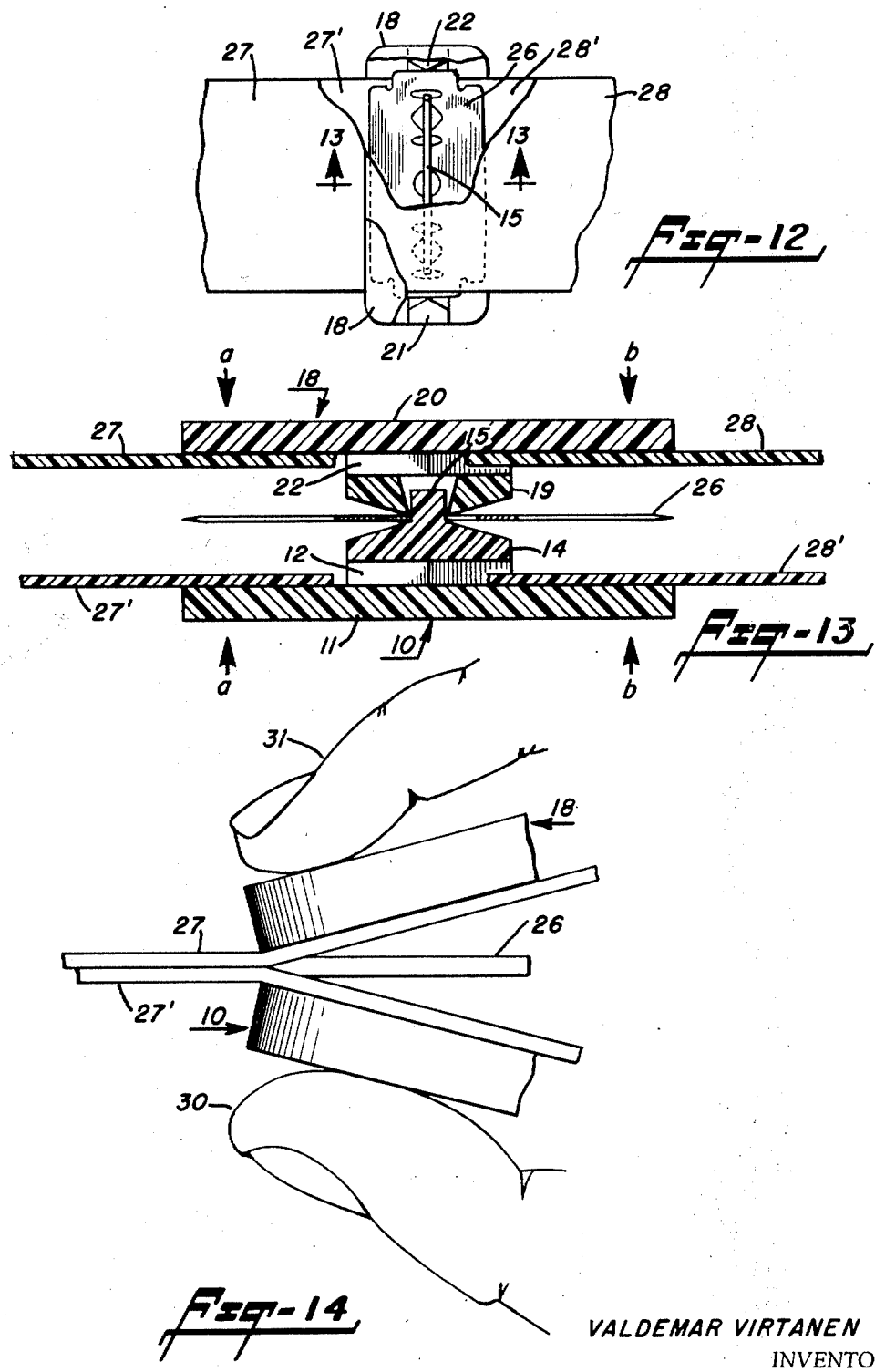

3,516,209
RAZOR BLADE STROPPER
Valdemar Virtanen, 830 42nd St.,
Brooklyn, N.Y. 11232
Filed Mar. 12, 1968, Ser. No. 712,458
Int. Cl. B24b *21/00*
U.S. Cl. 51—153
6 Claims

ABSTRACT OF THE DISCLOSURE

A strop passes through passageways formed in two, separable blade-holder members, said members being provided with cooperating means for receiving a razor blade. In the assembled device, the razor blade is positioned between the two members with the strop passing along both sides of the blade. An edge of the blade is clamped between the strop when corresponding sides of the blade-holder members are pressed together by finger pressure.

BACKGROUND OF THE INVENTION

Many devices have heretofore been proposed for stropping a razor blade, but these are of complex and expensive construction. Generally, such devices include mechanisms for automatically turning over the blade as relative movement between the strop and the blade holder is reversed, thereby to strop both surfaces of a blade edge. Devices incorporating a mechanical mechanism have a limited useful life and/or require maintenance. By reason of their construction, prior devices designed for use with double-edge safety razor blades apply a fixed, relatively low pressure between the blade edge and the strop, otherwise the blade may bend or break. These shortcomings of known devices rendered them unsatisfactory for stropping the modern, stainless steel blades, particularly the double edge blades.

A stropping device made in accordance with this invention is of simple, inexpensive construction, involves no mechanism, and simultaneously strops both surfaces of a blade edge. During the stropping operation, the two surfaces of a blade edge are clamped between the strop and two flat surfaces of the blade-holder members, thereby eliminating the possibility of the blade bending, irrespective of the applied pressure. A relatively high pressure permits the use of an inexpensive strop for quickly improving the cutting edges of used blades, particularly blades made of stainless steel.

SUMMARY OF THE INVENTION

The device comprises two, separate blade-holder members of generally similar construction, said members being provided with passageways through which the strop passes. Each member includes a central bar having a tapered outer surface, one bar having an elongated ridge extending therefrom and the other bar having an elongated slot formed therein. A double-edge razor blade is positionable between the two bars, with the said ridge passing through the central slot of the blade and into the said elongated slot. This loosely assembles together the two blade-holder members in the operative position, with the strop passing along both surfaces of the blade and with the blade edges disposed between corresponding flat surfaces of the said members. By pressing together corresponding sides of the two blade-holder members, by means of one's fingers, the strop and one blade edge are clamped between these flat surfaces. Thus, a considerable pressure can be applied during the blade-stropping operation, which stropping operation is effected by pulling the strop in a direction away from the blade edge which is under pressure. The relatively high stropping pressure permits the use of a strop made of an inexpensive, thermoplastic material such as, for example, a thin strip of polyethylene, for stropping blades, particularly blades made of stainless steel.

An object of this invention is the provision of an improved stropper device for razor blades, which device is of simple, inexpensive construction, comprises a minimum number of parts and in which the stropping pressure is applied by the fingers of the user.

An object of this invention is the provision of a razor blade stropper constructed and arranged for simultaneously stropping both surfaces defining a blade edge.

An object of this invention is the provision of a device for stropping a razor blade, and comprising a double strop extending above flat surfaces formed on a pair of blade-holder members, means for supporting a razor blade between the two blade-holder members with one edge thereof disposed between two portions of the strop, and means affording pivotal movement of the blade-holder members relative to each other in response to finger pressure applied thereto, thereby to clamp the said blade edge and the strop between the said flat surfaces.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purposes to the claims appended hereto.

BRIEF DESCRIPTION OF THE DRAWINGS

In the drawings wherein like reference characters denote like parts in the several views:

FIG. 1 is a top plan view showing the lower blade-holder member of a device made in accordance with this invention;

FIG. 2 is an end elevational view thereof;

FIG. 3 is a side elevational view thereof;

FIG. 4 is a bottom plan view thereof with a portion broken away;

FIG. 5 is a cross-sectional view taken along the line 5—5 of FIG. 1 and drawn to an enlarged scale;

FIG. 6 is a top plan view showing the matching, upper blade-holder member;

FIG. 7 is an end elevational view thereof;

FIG. 8 is a side elevational view thereof;

FIG. 9 is a bottom plan view thereof with a portion broken away;

FIG. 10 is a cross-sectional view taken along the line 10–10 of FIG. 6 and drawn to an enlarged scale;

FIG. 11 is a top plan view showing the two blade-holder members separated from each other and with the strop passing through the passageway formed in each of the members, and with a razor blade positioned on the lower member;

FIG. 12 is a similar view but showing the blade-holder members assembled together, portions of the upper member and strop being broken away;

FIG. 13 is an enlarged cross-sectional view taken along the line 13–13 of FIG. 12; and FIG. 14 is a greatly enlarged, fragmentary view showing an edge of the blade clamped between the strop when finger pressure is applied to corresponding side portions of the two blade-holder members.

DESCRIPTION OF THE PREFERRED EMBODIMENT

Reference now is made to FIGS. 1–5 showing the lower blade-holder member 10, preferably made of a clear plastic. This member comprises a generally rectangular, flat base 11 having cemented thereto a pair of spacers 12 and 13 which have tapered side walls presented toward each other. A central bar 14 has ends cemented to the spacers, said bar having a tapered outer surface terminating in an elongated ridge 15. It is here pointed out that the space between the bar 15 and the base 11 constitutes a passageway 16 for the strop. The elongated ridge 15 has a width and thickness such that it will fit through the central slot formed in a conventional double-edge razor blade.

The matching upper blade-holder member 18 is shown in the corresponding views of FIGS. 6–10, said member comprising the central bar 19 spaced from the base 20 by the tapered spacers 21 and 22. The bar 19 has an elongated slot 23 formed therein, which slot is defined by diverging side walls and accommodates the elongated ridge 15 of the upper blade-holder member. The space between the bar 19 and the base 20 constitutes a passageway for the strop. With specific reference to FIGS. 5 and 10, it will be apparent that when the elongated ridge 15, of the lower blade-holder member, is inserted into the elongated slot 23, of the upper blade-holder member, the tapered surfaces formed on the central bars 14 and 19 afford relative rocking movement of the two blade-holder members along a central axis. Such axis corresponds to the axis of a double-edge razor blade when the blade is inserted over the ridge 15.

Reference now is made to FIG. 11 which shows a single strop 25 threaded through the passageways of the two blade-holder members 10 and 18, that is, the strop passes under the central bars 14 and 19. A razor blade 26 is placed upon the bar 14 with the elongated ridge 15 extending through the centrol slot formed in the blade. The upper blade-holder member 18 now is turned over and loosely assembled to the other blade-holder member, with the projecting portion of the ridge 15 extending into the slot 23. It will be apparent that the two ends of the strop extend from the left side of the assembly whereas the folded-over portion of the strop extends from the right side thereof.

The described assembly is shown in the top plan view, FIG. 12, the contiguous portions of the strop now being identified by the numerals 27, 27' and 28, 28'. The upper blade-holder member 18 is broken away to show the upper portion of the strop passing over the blade 26, as well as the two spacers 21 and 22 having tapered side walls facing each other. A better understanding of the assembly will be had by reference to FIG. 13 which is an enlarged cross-sectional view taken along the line 13–13 of FIG. 12. In this view, the upper strop portions 27 and 28 are broken away to show the spacer 12. It will be noted that the strop passes along both surfaces of the blade 26, which blade is supported on the central bar 14, of the lower blade-holder member 10. A pivotal movement of the blade-holder members, toward one or the other blade edges, is effected by finger pressure applied either in the direction indicated by the arrows $a$ or $b$. The dimensions of the blade-holder members, as well as the central bars and the spacers, are such that when corresponding sides of the blade-holder members are pressed together, the two surfaces defining a blade edge lie in planes substantially parallel to the facing, flat surfaces of the bases 10 and 20. Furthermore, the tips of the two blade edges coincide, substantially, with the outer side walls of the bases 10 and 20.

As shown in the greatly enlarged, fragmentary view of FIG. 14, the blade-holder members are pressed together by the thumb 30 and forefinger 31 of the right hand, thereby clamping the blade edge between the two strop portions 27 and 27'. The pressure is applied only to the blade edge and consequently, there is no possibility of bending or snapping the blade, irrespective of the applied finger pressure. Upon pulling the strop ends to the left, with the left hand, while maintaining a desired pressure between the fingers of the right hand, the strop is drawn along the blade edge, thereby simultaneously stropping both sides of such edge. During such movement of the strop, the blade is disposed centrally of the blade-holder members and the trailing portions of the strop are spaced from the other blade edge. After the strop has been drawn to the left, the device is transferred to the left hand, the thumb and forefinger of the left hand are pressed against the other side portions of the blade-holder members, and the strop is drawn to the right with the right hand, thereby simultaneously stropping both surfaces of the other blade edge.

A considerable pressure can be developed between the thumb and forefinger, which pressure, in combination with the movement of the strop smoothly along the blade edge, results in a rapid stropping action. With a strop comprising a thin strip of thermoplastic material having an effective length of some five inches, four passes of the strop over a given blade edge, and in a direction normal to the edge, is sufficient to provide a good cutting edge. I have found that a polyethylene strop, having a thickness of approximately 0.030 inch is particularly suitable for stropping a modern, stainless steel blade. Referring to FIG. 12, the tapered side walls of the spacers 21 and 22 permit the drawing of the strop in a direction forming an angle to the blade edge, thereby resulting in an improved stropping action, as is well known.

The described device includes no moving parts subject to wear or misalignment. Polyethylene film is readily available so that the user can replace the strop, when necessary, at a nominal expense.

Having now described the invention those skilled in this art will be able to make various changes and modifications without thereby departing from the spirit and scope of the invention as recited in the following claims.

I claim:
1. A device for stropping a razor blade comprising,
   (a) a pair of blade-holder members,
   (b) means for supporting the blade between the blade-holder members,
   (c) a strop passing through each of the blade-holder members and along both sides of the blade; and
   (d) cooperating means formed on the blade-holder members and affording relative pivotal movement of side portions of the said members toward each other about an axis corresponding substantially to the axis of the blade.
2. A device for stropping razor blades having a slot formed therein, said device comprising,
   (a) a first blade-holder member having a central bar spaced from a base to form a passageway, said bar having an elongated ridge extending therefrom, which ridge is insertable through the slot of the blade,
   (b) a second blade-holder member having a central bar spaced from a base to form a passageway, said bar having an elongated slot formed therein, which slot accommodates the said elongated ridge, and
   (c) a strop passing through the passageways formed in the two blade-holder members.
3. The invention as recited in claim 2, wherein the strop is a thermoplastic material.
4. The invention as recited in claim 2, wherein the strop is a strip of polyethylene.
5. The invention as recited in claim 2, wherein the central bar of the second blade-holder member has a tapered outer surface and the said slot is defined by tapered side walls, and wherein the central bar of the first blade-holder member has a tapered outer surface extending from both sides of the said ridge.

6. The invention as recited in claim 2, wherein the bases of the two blade-holder members have flat, inner surfaces, wherein the width of each base is substantially equal to that of the blade, and wherein the base of said ridge and an upper side edge of the associated base lie in a plane forming an angle with the inner flat surface of such base, which angle is substantially equal to one-half that of the blade edge angle.

References Cited

FOREIGN PATENTS

| | | |
|---|---|---|
| 497,384 | 5/1930 | Germany. |
| 382,941 | 10/1932 | Great Britain. |
| 673,306 | 3/1939 | Germany. |

JAMES L. JONES, JR., Primary Examiner